United States Patent
Klinger et al.

(12)

(10) Patent No.: US 6,171,434 B1
(45) Date of Patent: Jan. 9, 2001

(54) SEPARATION LAYER METHOD FOR THE FLAT COATING OF SMOOTH SURFACES (STRAIGHT OR CURVED) WITH SELF-ADHESIVE FOIL

(75) Inventors: Georg Klinger, Wörth; Hubert Klinger, München, both of (DE)

(73) Assignee: Atlas Vertriebs GmbH, Munich (DE)

( * ) Notice: Under 35 U.S.C. 154(b), the term of this patent shall be extended for 0 days.

(21) Appl. No.: 09/142,816

(22) PCT Filed: May 24, 1996

(86) PCT No.: PCT/DE96/00900

§ 371 Date: Sep. 10, 1998

§ 102(e) Date: Sep. 10, 1998

(87) PCT Pub. No.: WO97/45248

PCT Pub. Date: Dec. 4, 1997

(51) Int. Cl.[7] .................................................. B32B 31/12
(52) U.S. Cl. ............................................................ 156/289
(58) Field of Search ........................ 156/289; 428/41.7, 428/41.8, 42.1, 343, 352

(56) References Cited

U.S. PATENT DOCUMENTS

| 4,751,121 | * | 6/1988 | Kuhnel et al. . |
| 5,294,278 | * | 3/1994 | Matsui et al. . |
| 5,489,474 | * | 2/1996 | Shinoda et al. . |
| 5,643,676 | * | 7/1997 | Dobashi et al. . |
| 5,688,346 | * | 11/1997 | Corbusier . |
| 5,747,132 | * | 5/1998 | Matsui et al. . |
| 5,810,960 | * | 9/1998 | Matsui et al. . |
| 6,045,922 | * | 4/2000 | Janssen et al. . |

FOREIGN PATENT DOCUMENTS

| 0 580 037 | * | 1/1994 | (EP) . |
| 56-62861 | * | 5/1981 | (JP) . |

* cited by examiner

Primary Examiner—Curtis Mayes
(74) Attorney, Agent, or Firm—Kilpatrick Stockton

(57) ABSTRACT

Process of applying a self-adhesive film to a surface of an automobile or other vehicle. Later removal of the film is facilitated by first applying a parting layer to the surface, except for surface regions being covered by the perimeter and certain other areas of the self-adhesive film.

2 Claims, 1 Drawing Sheet

SEPARATION LAYER METHOD FOR THE FLAT COATING OF SMOOTH SURFACES (STRAIGHT OR CURVED) WITH SELF-ADHESIVE FOIL

DESCRIPTION

The generally used method for aiding in the application of self-adhesive films to large surfaces without air bubbles or wrinkles consists of moistening the surface to be coated with water (usually treated with detergent or a similar surfactant); this strongly reduces the initial tack of the film applied thereto; the piece of film can still be adjusted to fit exactly. Air bubbles and water are smoothed out with a doctor blade.

This method is not suitable for the coating/adhesive covering of contoured and nonhorizontal surfaces: At contours, edges, compound curves, etc., the film is stretched, or deformed with the use of a heat gun; in these areas, the film must immediately adhere with full adhesion, so that it does not revert to its original shape. Water used as a parting layer on contoured and nonhorizontal surfaces would not be fixable (it runs) and would reduce or impair the adhesion of the film in those areas in which full adhesion is necessary.

Manufacturers of self-adhesive films, for their part, attempt to reduce initial tack and allow for the smoothing out of residual air pockets under the film through the composition of the adhesive or by means of additions to the adhesive:

- a layer of extremely fine glass beads on the adhesive layer creates a kind of spacer; only after pressure from the doctor blade are the beads pressed into the adhesive, which then develops its full adhesive strength;
- the composition of certain adhesives is designed so that their level of adhesion is initially low, yet increases after a certain interval of time.

The drawbacks of these methods lie in their relatively complicated manufacture and the associated costs.

The goal consisted of developing a separating method that fulfills several requirements:

- It must be possible to apply the self-adhesive film to the surface to be covered with a low initial tack, so that exact positioning is possible (one must be able to remove it, correct its position, and reapply it easily);
- the parting agent must be easy to apply;
- the parting agent must not run and must allow for its application in a flat coat to smooth surfaces, also contoured, uneven, and nonhorizontal ones, as required by the user;
- the use of the parting agent must allow the removal of air bubbles which remain under the film during application through smoothing with a doctor blade;
- the full adhesion of the film shall act only on the perimeter of each surface (exception: areas, in which the film was deformed and also needs great adhesion). The adhesion of the film on the balance of the surface areas shall be reduced, to facilitate the later removal of the film.

Through the use of the method of the present invention these requirements can be met:

Oils/greases or substances containing oils/greases reduce the initial tack of the film adhesive; the newly applied piece of film can easily be taken off again and correctly reapplied;

at the proper temperature the above substances can be easily applied to the surfaces which are to be coated;

because of their viscosity, they cannot run;

air pockets under the adhesive film can be smoothed out to the edge of the coated surface;

the reduced adhesion that results from the application of the parting agent disclosed herein onto the appropriate surface areas allows for the easier removal of the film coating later;

EXAMPLE OF USAGE

The method described herein can be used primarily for the complete surface coating of passenger cars, specifically for taxis.

Here the vehicles whose exterior color is dictated by law according to their use in the transportation industry are completely covered with self-adhesive film of the required color. Upon sale of the vehicle, the film is removed. The technique of film covering allows color-neutral vehicle purchases for taxi companies and thereby also increases the resale value of the vehicles.

The use of the method described herein facilitates the attachment of the film covering and its later removal.

BRIEF DESCRIPTION OF THE DRAWING

The FIGURE illustrates a vehicle door covered with a parting agent, according to a preferred embodiment of the present invention.

Application of parting agent, such as a mineral oil or grease, synthetic oil or grease or a fluid or creamy product that contains oil or grease, onto a vehicle door to be covered with self-adhesive film: the perimeter of the door surface, the groove, and the door handle depression were avoided in the otherwise surface-coating application of the parting agent, since 100% adhesion is required in these areas; on the balance of the surface the adhesion of the film is reduced, which makes removal of the film coating easier.

Figure 1:
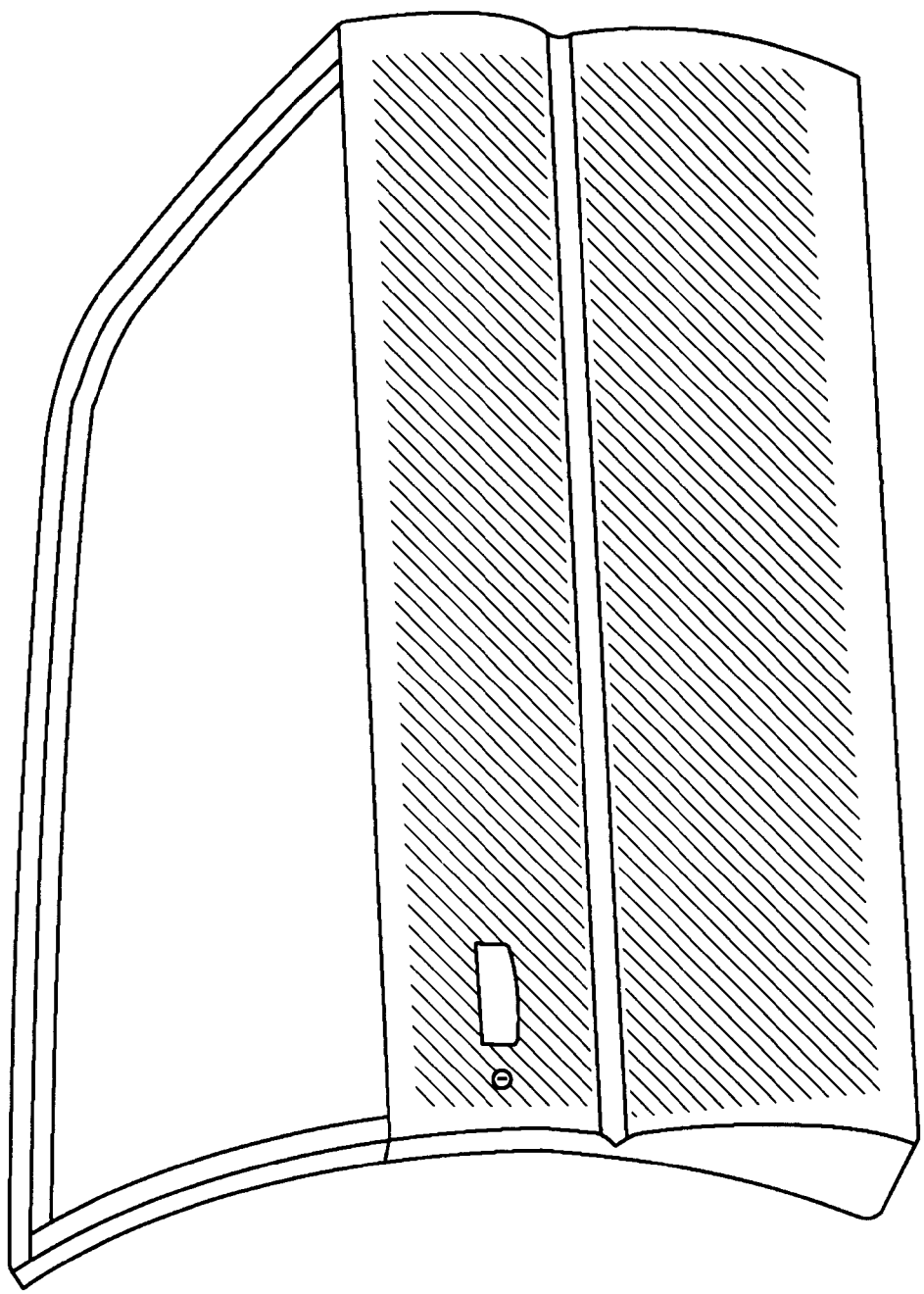

What is claimed is:

1. A method for the application of self-adhesive films onto a surface of an automobile of any kind, wherein:

prior to applying the self-adhesive film to the vehicle, a parting agent is applied to the surface except for regions to be covered by the perimeter and certain other areas of the film, so that full adhesion of the self-adhesive film in the perimeter and the certain other areas is not impaired while adhesion in remaining areas of the surface is reduced, thereby facilitating later removal of the film from the surface.

2. A method as in claim 1, comprising:

using a parting agent comprising mineral oil or grease, synthetic oil or grease, or a fluid or creamy product that contains oil or grease.

* * * * *